US012800014B2

(12) United States Patent
Nichols et al.

(10) Patent No.: US 12,800,014 B2
(45) Date of Patent: Nov. 17, 2026

(54) LINEAR ACTUATOR WITH A SPHERICAL JOINT

(71) Applicant: Wisk Aero LLC, Mountain View, CA (US)

(72) Inventors: Chase Nichols, Kirkland, WA (US); Shawn Falzone, Buffalo, NY (US); Tim Hillsamer, Oxford (NZ)

(73) Assignee: Wisk Aero LLC, Mountain View, CA (US)

( * ) Notice: Subject to any disclaimer, the term of this patent is extended or adjusted under 35 U.S.C. 154(b) by 0 days.

(21) Appl. No.: 19/088,526

(22) Filed: Mar. 24, 2025

(65) Prior Publication Data

US 2025/0305565 A1 Oct. 2, 2025

Related U.S. Application Data

(60) Provisional application No. 63/569,981, filed on Mar. 26, 2024.

(51) Int. Cl.
*F16H 25/20* (2006.01)
*B64C 27/20* (2023.01)
(Continued)

(52) U.S. Cl.
CPC ............. *F16H 25/20* (2013.01); *B64C 27/20* (2013.01); *B64C 27/28* (2013.01); *F16C 11/06* (2013.01);
(Continued)

(58) Field of Classification Search
CPC ............. F16H 25/20; F16H 2025/2031; F16H 2025/2037; F16H 2025/2081; B64C 27/20; B64C 27/28; F16C 11/06
See application file for complete search history.

(56) References Cited

U.S. PATENT DOCUMENTS

2005/0073673 A1* 4/2005 Devitt ................ G01N 21/6447 356/37
2010/0054641 A1 3/2010 Snow
(Continued)

FOREIGN PATENT DOCUMENTS

WO 2022226012 A1 10/2022

OTHER PUBLICATIONS

Application No. PCT/US2025/021162 , International Search Report and Written Opinion, Mailed On Jun. 4, 2025, 12 pages.

*Primary Examiner* — Terence Boes
(74) *Attorney, Agent, or Firm* — Kilpatrick Townsend & Stockton LLP

(57) ABSTRACT

Embodiments of the invention are directed to a linear actuator with a spherical joint. The spherical joint can provide a capacity for rotational adjustments between the linear actuator and an external structure to which the linear actuator is coupled by the spherical joint. The spherical joint can prevent external forces from entering the linear actuator and/or prevent misalignment between components of the linear actuator when external structures move or shift. The spherical joint can be configured so that it is parallel to a translating component of the linear actuator. For example, an axis of a hollow channel within the spherical joint can be parallel to and/or coincident with an axis of the translating component. The translating component may pass through the hollow channel of the spherical joint when actuated.

18 Claims, 7 Drawing Sheets

(51) Int. Cl.
*B64C 27/28* (2006.01)
*F16C 11/06* (2006.01)

(52) U.S. Cl.
CPC ................ *F16H 2025/2031* (2013.01); *F16H 2025/2037* (2013.01); *F16H 2025/2081* (2013.01)

(56) References Cited

U.S. PATENT DOCUMENTS

| | | | | |
|---|---|---|---|---|
| 2011/0177748 | A1 | 7/2011 | Luo | |
| 2018/0087634 | A1 | 3/2018 | Muster | |
| 2019/0101195 | A1 | 4/2019 | Kwasniewski | |
| 2020/0207465 | A1 | 7/2020 | Kopp | |
| 2024/0246670 | A1* | 7/2024 | Long | B64C 29/0033 |

* cited by examiner

LINEAR ACTUATOR WITH A SPHERICAL JOINT

CROSS-REFERENCES TO RELATED APPLICATIONS

This application claims benefit under 35 USC § 119 (e) to U.S. Provisional Patent Application No. 63/569,981 filed Mar. 26, 2024, and entitled "Linear Actuator With A Spherical Bearing," the disclosure of which is incorporated by reference herein in its entirety for all purposes.

BACKGROUND

Linear actuators can be susceptible to undesirable misalignment between internal components of the linear actuator. If an external structure shifts or moves, a linear actuator attached to the external structure may experience bending or twisting loads. These loads can cause stress and/or movement of various components within the linear actuator, leading to misalignment. Misalignment leads to added load on the internal components of the linear actuator, which can cause damage, operational inefficiency, and reduced service life for the linear actuator and/or the system incorporating the linear actuator.

Embodiments address these, and other problems.

SUMMARY

Embodiments of the invention provide a linear actuator comprising: a housing; a translating component configured to translate relative to the housing; and a spherical joint coupled to the housing and oriented parallel to a longitudinal axis of the translating component, wherein the translating component is configured to translate with respect to the spherical joint and the housing.

According to various embodiments, the spherical joint includes a hollow channel, and the translating component is at least partially disposed within the hollow channel.

According to various embodiments, the spherical joint includes a hollow channel, and the translating component is at least partially disposed within the hollow channel, wherein the translating component is configured to translate through the hollow channel when the linear actuator operates.

According to various embodiments, the longitudinal axis of the translating component is a first longitudinal axis, wherein the hollow channel has a second longitudinal axis, and the first longitudinal axis is parallel to the second longitudinal axis.

According to various embodiments, a portion of the housing is disposed within the hollow channel, and the translating component is at least partially disposed within the portion of the housing within the hollow channel.

According to various embodiments, the linear actuator further comprises a coupler coupled to a first end of the translating component, wherein the translating component is configured to translate with respect to the spherical joint and the housing, and wherein the spherical joint and the housing are positioned between the first end and a second end of the translating component provided opposite from the first end.

According to various embodiments, the spherical joint is a first spherical joint, the coupler is a second spherical joint oriented perpendicular to the longitudinal axis of the translating component, the second spherical joint has fixed location relative to the translating component, and the second spherical joint is oriented perpendicular to the first spherical joint.

According to various embodiments, the spherical joint is configured to couple the housing to a first structure, and the coupler is configured to couple the translating component to a second structure, such that the linear actuator to configured to cause the second structure to move relative to the first structure.

According to various embodiments, the linear actuator further comprises a driving component coupled to the housing and provided around the translating component, and configured to cause the translating component to translate; and an electric motor provided within the housing and configured to operate the driving component.

According to various embodiments, the translating component is configured to translate relative to the spherical joint, the housing, the driving component, and the electric motor, and wherein the spherical joint, the housing, the driving component, and the electric motor are configured to maintain fixed positions relative to one another.

According to various embodiments, the linear actuator further comprises a driving component coupled to the housing and provided around the translating component, wherein the translating component is coaxial with the driving component.

According to various embodiments, the linear actuator further comprises a coupler coupled to the translating component, wherein the spherical joint is configured to couple the housing to a first structure, wherein the coupler is configured to couple the translating component to a second structure, wherein the spherical joint is configured to passively adjust positioning in response to a position change of the first structure or the second structure, thereby maintaining alignment between the translating component and the driving component.

According to various embodiments, the spherical joint includes: a bracket configured to couple to a first structure; an outer race coupled to the bracket; and an inner race disposed within the outer race and coupled to the housing, the inner race having a spherical shape with a hollow channel, wherein a portion of the housing is disposed within the hollow channel, and the translating component is at least partially disposed within the portion of the housing within the hollow channel.

According to various embodiments, the inner race is configured to rotate within the outer race such that the spherical joint is configured to passively adjust position in response to external forces.

According to various embodiments, the inner race has at least two degrees of rotational freedom.

According to various embodiments, the linear actuator further comprises a notch and a tab configured to restrict the inner race from rotating about the longitudinal axis of the translating component.

According to various embodiments, the linear actuator has a stroke-to-length ratio equal to or less than 1.2 to 1.

Further embodiments of the invention provide an aircraft comprising a tiltable propulsion system coupled to the linear actuator.

Further embodiments of the invention provide a system comprising a linear actuator including: a housing; a translating component configured to translate relative to the housing; and a spherical joint coupled to the housing and oriented parallel to a longitudinal axis of the translating component, wherein the translating component is configured to translate with respect to the spherical joint and the housing; the system further comprising a first structure coupled to the housing by the spherical joint; and a second structure coupled to the translating component, wherein the translating component is configured to cause the second structure to move relative to the first structure when the translating component is actuated.

According to various embodiments, the first structure is a support structure of an aircraft, the second structure is a tiltable propulsion system of the aircraft, and the translating component is configured to cause the tiltable propulsion system to tilt when the translating component is actuated.

According to various embodiments, the spherical joint is configured to passively adjust in response to a position change or an angle change of the first structure or the second structure, thereby maintaining internal alignment of the linear actuator.

Further details regarding embodiments of the invention can be found in the Detailed Description and the Figures.

BRIEF DESCRIPTION OF THE DRAWINGS

Various embodiments of the invention are disclosed in the following detailed description and the accompanying drawings. In the appended figures, similar components or features may have the same reference label. Further, various components of the same or similar type may be distinguished by following the reference label by a dash and a second label that distinguishes among the similar components.

DETAILED DESCRIPTION

Embodiments of the invention are directed to a linear actuator with a spherical joint. The spherical joint provides for rotational adjustments between the linear actuator and an external structure to which the linear actuator is coupled via the spherical joint. As a result, the spherical joint can prevent external forces from impacting the linear actuator and/or prevent misalignment between components of the linear actuator when external structures coupled to the linear actuator move or shift.

According to embodiments, the spherical joint can be configured so that it is parallel to a translating component of the linear actuator. For example, an axis of a hollow channel within the spherical joint can be parallel to and/or coaxial with the translating component. The translating component may pass through the hollow channel of the spherical joint when actuated. This configuration allows the linear actuator to be compact and with a favorable stroke-to-length ratio.

A linear actuator can include any suitable device configured to cause linear motion. A linear actuator can be configured to convert rotary motion into linear motion. A linear actuator may be a 2-force member actuator, providing force along an axis in either direction. According to embodiments, a linear actuator can take the form of any suitable type or style of linear actuator. Primarily depicted in the figures and described herein is an electrically-powered ball screw linear actuator. A ball screw can be a continuous slope device that provides mechanical advantage. A stator assembly rotates to drive a screw type shaft in a desired direction. Embodiments also apply to wheel and handle actuators (e.g., a belt, chain, rack, or cable is attached to the shaft), cam actuators, or any other suitable type of linear actuator.

Figure 1A:
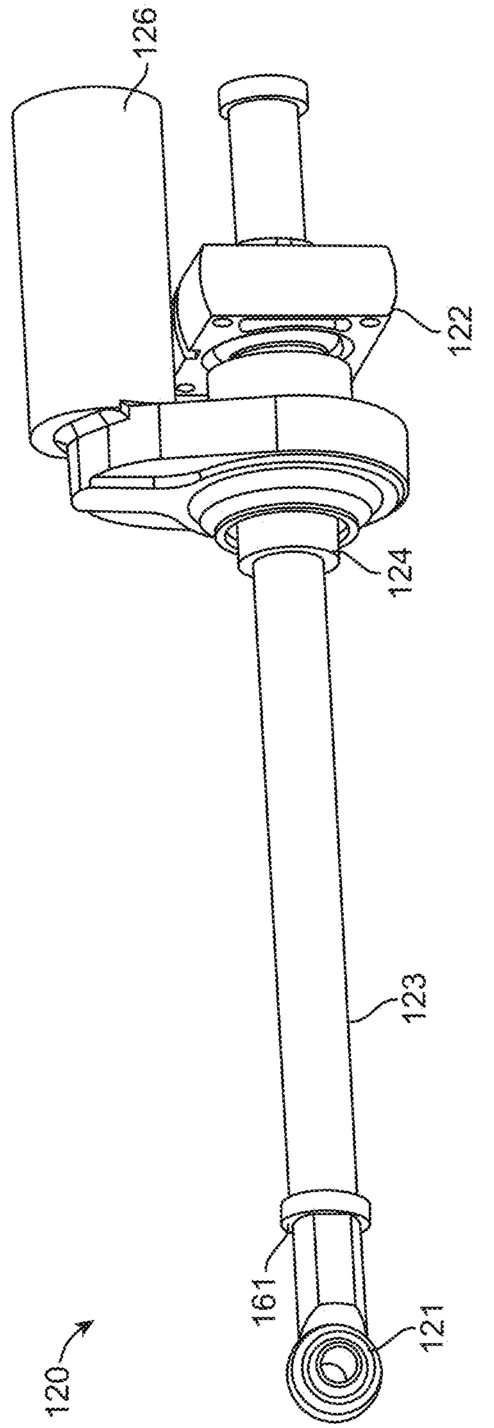
FIG. 1A shows a perspective view of a linear actuator, according to embodiments.
Figure 1B:
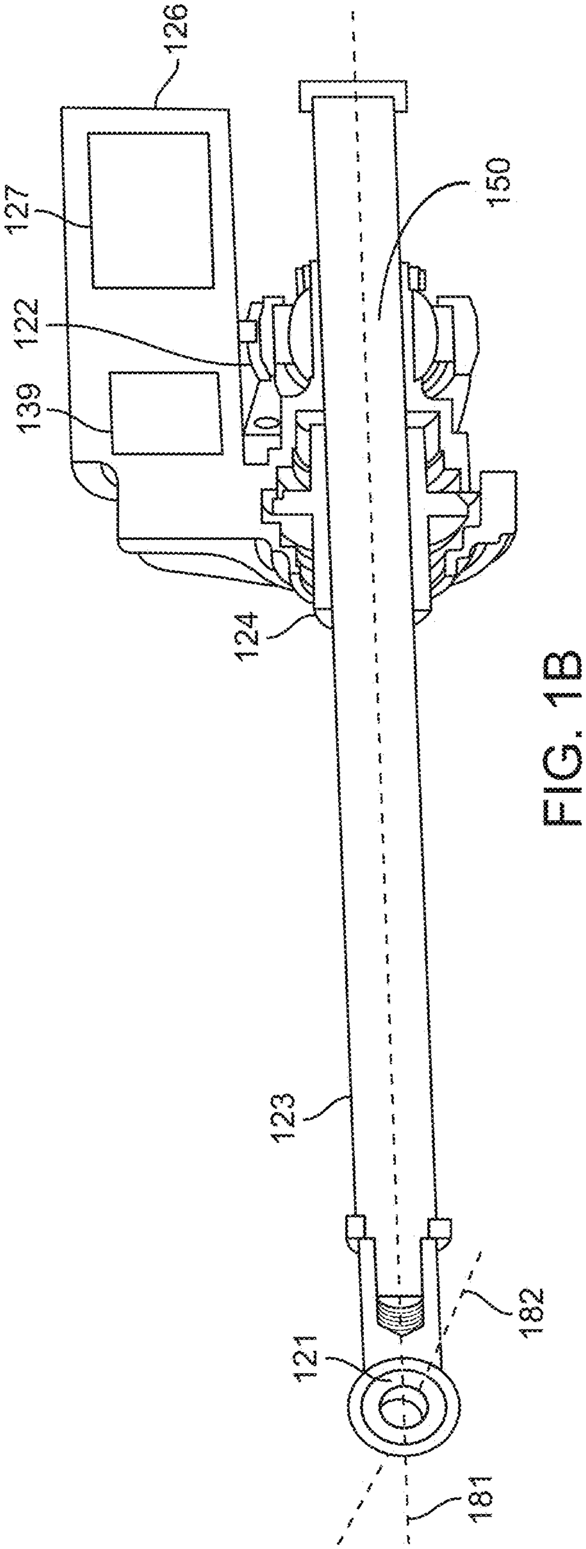
FIG. 1B shows a cross section of a linear actuator, according to embodiments.

FIGS. 1A-1B illustrate an example of a linear actuator 120, according to embodiments. FIG. 1A shows a perspective view of the linear actuator 120, and FIG. 1B shows a cross section of the linear actuator 120. The linear actuator 120 can include a translating component 123, a driving component 124, a housing 126 containing a motor 127, a spherical joint 122 with a hollow channel 150, a coupler 121, and/or any other suitable components.

The translating component 123 can be configured to translate (e.g., move linearly). For example, the translating component 123 may translate relative the housing 126 and/or the driving component 124. The translating component 123 may translate linearly along its longitudinal axis when actuated by the driving component 124. The translating component 123 can take the form of a rod, shaft, lead screw, or any other suitable elongated object which may be cylindrical or have any suitable shape. The translating component 123 can be threaded and/or include ball grooves.

The driving component 124 can be configured to cause the translating component 123 to translate. The driving component 124 can be coupled the housing 126 and/or the translating component 123. The driving component 124 may surround the translating component 123 such that the translating component 123 moves through the driving component 124 (e.g., through a hollow channel within the driving component 124). In some embodiments, the driving component 124 can include ball bearings that recirculate on an internal track within the driving component 124. Some examples of a driving component 124 include a drive nut, a slide block, or a lead nut.

The housing 126 can include any suitable structure for housing components of the linear actuator 120. The housing 126 may be a structure configured to fully or partially enclose one or more components and/or provide structural support to the linear actuator 120. For example, the housing 126 may enclose, contain, and/or be coupled to the driving component 124, the motor 127, a gear box 139, and/or any other suitable components. The housing 126 may also be referred to as a body, a bracket, or a block. FIG. 1A includes an indication of the housing 126 which points to a cylindrical body. According to embodiments, the cylindrical body may be a part of the housing 126, and the housing 126 further includes additional structure (e.g., the structure surrounding the driving component 124). For example, FIGS. 2A-2C and FIG. 3 indicate additional portions of the housing 126.

The motor 127 can be configured to operate the driving component 124 and thereby the translating component 123. The motor 127 may include a stator and/or rotor. The motor 127 may be an electric motor. According to embodiments, the motor 127 may be coupled to a set of one or more gears referred to as a gear box 139. The gear box 139 may also be coupled to the driving component 124. The rotor may be configured to cause a first gear of the gear box 139 to rotate. A final gear of the gear box 139 may contact or otherwise be configured to cause motion in or at the driving component 124.

According to embodiments, the translating component 123 may have a dynamic position relative to some or all of the other components of the linear actuator 120. For example, the translating component 123 may be configured to translate relative to the housing 126, the driving component 124, the motor 127, the gear box 139, and/or the spherical joint 122. Besides the translating component 123, components contained within or coupled to the housing 126 may remain in fixed locations relative to the housing 126. For example, the housing 126, the driving component 124, the motor 127, the gear box 139, and/or the spherical joint 122 may be configured to maintain fixed positions relative to one another.

Figure 2A:
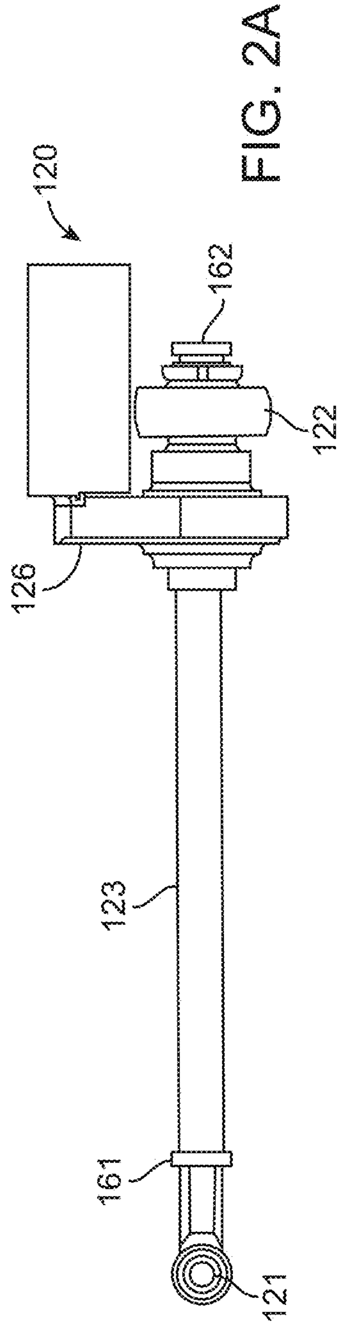
FIGS. 2A-2C illustrate different position states of linear actuator, according to embodiments.
Figure 2B:
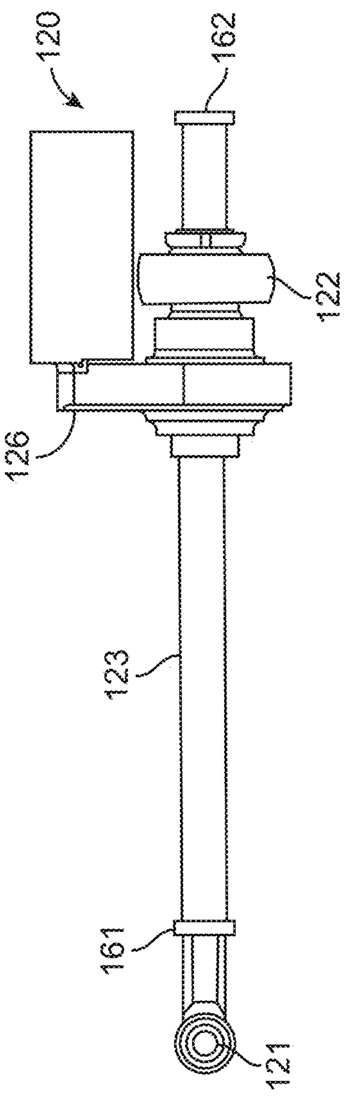
Figure 2C:
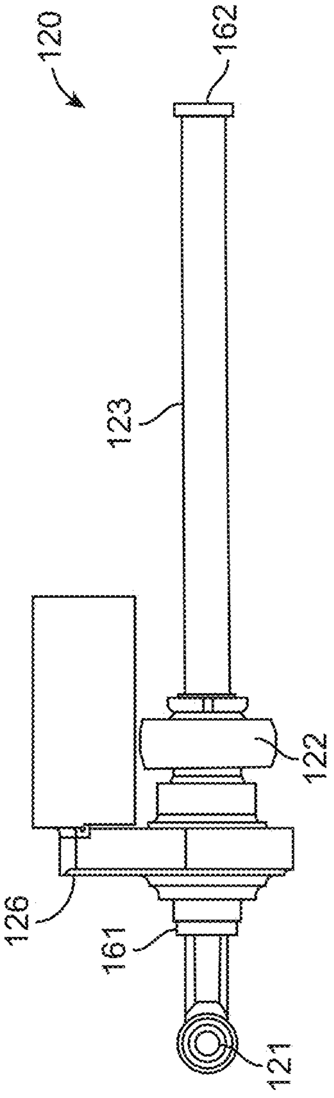

FIGS. 2A-2C illustrate different position states of linear actuator 120 during operation. FIG. 2A illustrates the linear actuator 120 in a fully extended state. FIG. 2B illustrates the linear actuator 120 in a partially extended state. FIG. 2C illustrates the linear actuator 120 in a retracted (or nearly fully retracted) state. As shown in FIG. 2A, when the linear actuator 120 is in the fully extended state, the spherical joint 122 may be located near the second end 162 of the translating component 123, and the first end 161 may be at a maximum distance from the spherical joint 122. As shown in FIG. 2C, when the linear actuator 120 is in the retracted state, the spherical joint 122 may be located relatively closer to the first end 161 of the translating component 123, and the second end 162 of the translating component 123 may be near or at a maximum distance from the spherical joint 122.

The linear actuator 120 may be coupled to two structures, according to embodiments. The spherical joint 122 may be configured to couple the housing 126 of the linear actuator 120 to a first structure. The coupler 121 (provided at the first end of the translating component 123) may be configured to couple the translating component 123 of the linear actuator 120 to a second structure. As a result, the linear actuator 120 may be configured to cause the second structure to move relative to the first structure, or to otherwise actuate the second structure. As discussed in more detail below and depicted in FIGS. 6A-6B, examples of the first structure and the second structure may be a support structure (e.g., a boom) and a tiltable propulsion system of an aircraft, respectively, where the linear actuator 120 is configured to cause tilting of the tiltable propulsion system relative to the support structure.

Referring back to FIGS. 1A-1B, the translating component 123 may be aligned with the driving component 124. For example, a longitudinal axis of the driving component 124 may be parallel to a longitudinal axis of the translating component 123. The translating component 123 may be centered within the driving component 124 (e.g., within a hollow channel of the driving component 124). The translating component 123 may be coaxial with the driving component 124.

Internal alignment of the linear actuator 120 may enable the linear actuator 120 to operate, to actuate efficiently, to reduce wear and tear, and/or may otherwise be desired. Internal alignment of the linear actuator 120 can include alignment between two or more of the driving component 124, the translating component 123, the housing 126, a gear box 139, the motor 127, and/or any other suitable components of the linear actuator 120.

According to embodiments, the spherical joint 122 (also referred to as a spherical bearing) may be a flexible joint. The spherical joint 122 may be configured to passively adjust position or configuration in response to external forces. External forces may be caused by a position change or an angle change of one or more structures to which the linear actuator 120 is coupled (e.g., the first structure or the second structure). Adjustment and/or flexibility provided by the spherical joint 122 can prevent external forces from impacting other components of the linear actuator 120, which could cause misalignment or other undesirable effects. For example, a bending load may cause a slight rotation of the spherical joint 122 instead of adding an extra load onto the housing 126, and thereby allow the housing 126 to stay aligned with the driving component 124 and the translating component 123. The spherical joint 122 may allow the linear actuator 120 as a whole to experience a change in angle or position without any components (e.g., other than the spherical joint 122) bending or twisting. The spherical joint 122 can thereby enable the linear actuator 120 to maintain internal alignment (e.g., between the translating component 123 and the driving component 124) and/or undergo movement without experiencing extra loads.

The spherical joint 122 can be coupled to the housing 126. The spherical joint 122 can also be configured for coupling to an external structure (e.g., a support structure as discussed in more detail below). As mentioned above, the spherical joint 122 may be positioned dynamically relative the translating component 123 and/or the spherical joint 122 may have a fixed location relative to the housing 126 (e.g., as well as other components).

The spherical joint 122 can include a hollow channel 150 (also referred to as a space, gap, or opening). The hollow channel 150 may extend through the center of the spherical joint 122 from a first end to a second (e.g., opposite) end of the spherical joint 122. The hollow channel 150 may have a cylindrical shape, or any other suitable shape. The hollow channel 150 may include a longitudinal axis (also referred to as a central axis or a centerline) which may intersect a center point of the spherical joint 122.

According to embodiments, the spherical joint 122 can be oriented parallel to the translating component 123. For example, a longitudinal axis of the hollow channel 150 may be parallel to and/or coaxial (also referred to as coincident or in-line) with a longitudinal axis of the translating component 123.

According to embodiments, the translating component 123 may be at least partially disposed within the spherical joint 122. For example, the translating component 123 may be partially disposed within the hollow channel 150, and/or the spherical joint 122 can be configured to surround the translating component 123. The translating component 123 may be configured to translate within and/or through the hollow channel 150 during actuation of the linear actuator 120. As a result, different portions of the translating component 123 may be within the hollow channel 150 at different times or different actuation positions. Some or all of the translating component 123 can pass through and beyond a center point of the spherical joint 122. The translating component 123 may be configured to move linearly through the hollow channel 150 without contacting the walls of the hollow channel 150 or other parts of the spherical joint 122.

One or more dimensions of the spherical joint 122 may be larger than corresponding dimensions of the translating component 123. For example, an outer radial diameter of a spherical component (e.g., an inner race) of the spherical joint 122 can be larger than the radial diameter of the translating component 123. Additionally, a diameter of the hollow channel 150 of the spherical joint 122 may be larger than the diameter of the translating component 123. In some embodiments, the diameters of the hollow channel 150 and the translating component 123 may be approximately equivalent with a slight margin to allow the translating component 123 to move within the hollow channel 150 without friction. In other embodiments, the diameter of the translating component 123 may be small enough to allow other structures (e.g., a portion of the housing 126) to also fit within the hollow channel 150.

As mentioned above, the linear actuator 120 may include a coupler 121 for coupling the translating component 123 to a second structure. According to embodiments, the coupler 121 may be located at, coupled to, and/or fixedly connected to a first end 161 of the translating component 123. Accordingly, the coupler 121 may have a fixed location relative to the translating component 123.

The coupler 121 can be any suitable coupling mechanism. As illustrated in FIGS. 1A-1B, in some embodiments, the coupler 121 may take the form of a second spherical joint. The second spherical joint can be coupled to an external structure via a bolt through a hollow channel in the center of the spherical joint, as an example. The second spherical joint may be oriented perpendicular (e.g., instead of parallel) to the translating component 123 and/or the spherical joint 122 (also referred to as the first spherical joint). For example, an axis 182 of the hollow channel in the second spherical joint may be perpendicular to the longitudinal axis 181 of the translating component 123 and/or the hollow channel 150 of the first spherical joint. In some embodiments, the coupler 121 can have an outer diameter (e.g., of a spherical structure) that is similar to or the same as the diameter of the translating component 123.

Taken together, the spherical joint 122 and the coupler 121 in the form of a second spherical joint can provide full capacity for preventing movements of two external structures from causing an internal misalignment between components of the linear actuator 120. In some embodiments, the linear actuator 120 may move or turn as a whole. However, the linear actuator 120 may maintain internal alignment and not experience undue loads or forces internally.

As shown in FIGS. 1A-1B, in some embodiments, the spherical joint 122 can be larger than the coupler 121. For example, both an outer diameter (e.g., of a spherical component) and an inner diameter (e.g., of the hollow channel 150) of the spherical joint 122 can be larger than corresponding diameters of the coupler 121. A larger size of the spherical joint 122 can advantageously provide greater strength at the spherical joint 122.

A spherical joint may, by design, have a greater strength (e.g., load capacity) in radial directions (e.g., perpendicular to the longitudinal axis) as compared to axial directions. Accordingly, the coupler 121 may be oriented to experience loads in the radial (e.g., stronger) direction. Spherical joints are not typically positioned and oriented to receive loads in axial directions. However, in embodiments, the spherical joint 122 may be positioned and oriented to receive loads in the axial (e.g., weaker) direction. Embodiments compensate for these axial loads with the larger size. The increased size provides a greater load capacity in all directions, including the axial direction. According to embodiments, the spherical joint 122 can be capable, due to the larger size, of bearing the same or similar load axially as the coupler 121 can bear radially.

Additionally, due to the larger size, the spherical joint 122 can be composed of lightweight weight materials (e.g., lighter weight than used for a smaller coupler, such as the coupler 121) and still provide sufficient load capacity. Also, the larger size enables the spherical joint 122 to accommodate the translating component 123 within the hollow channel 150 so that the spherical joint 122 can have a dynamic position relative to the translating component 123, as discussed above.

Figure 3:
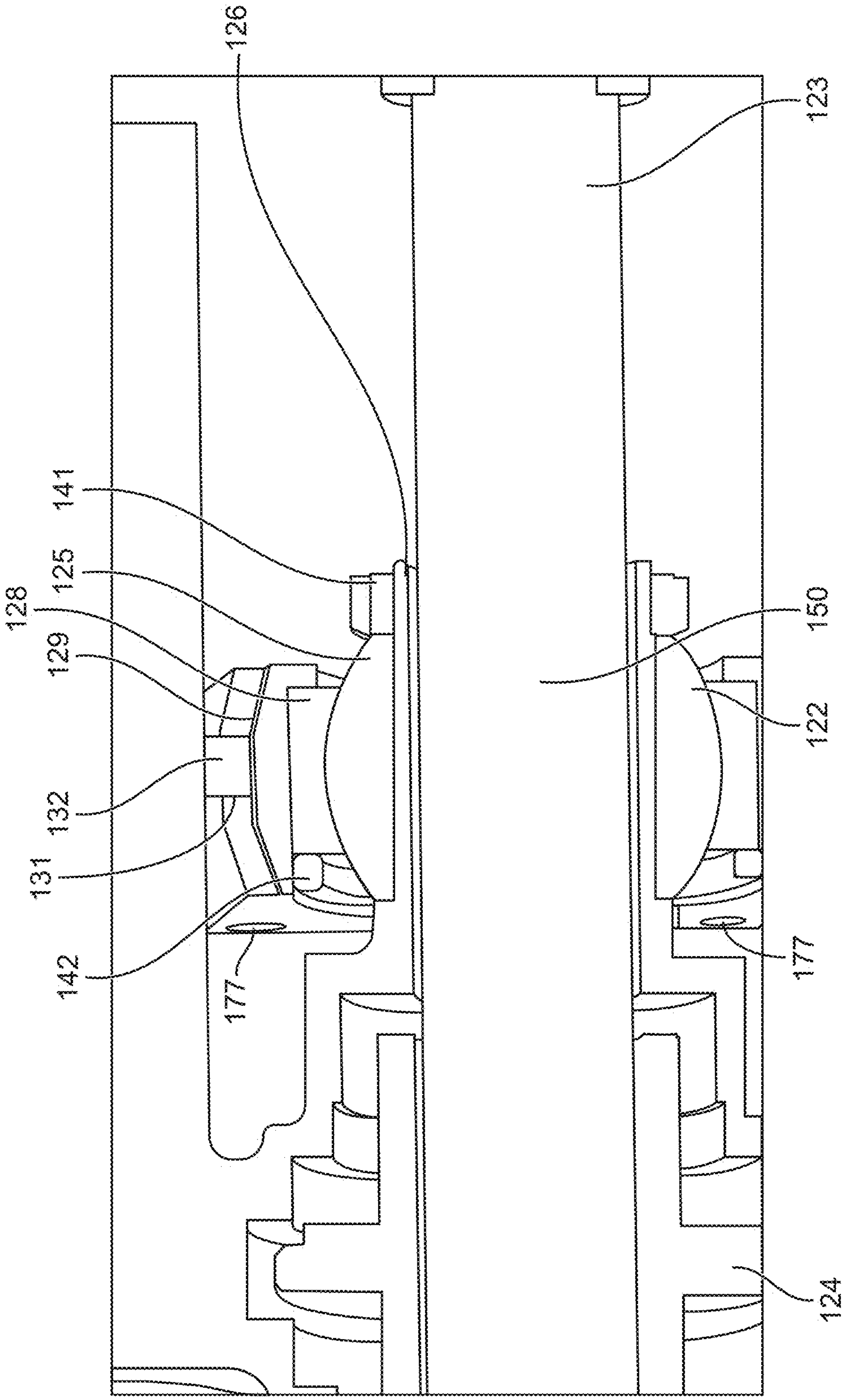
FIG. 3 illustrates a cross section of a spherical joint of a linear actuator, according to embodiments.

FIG. 3 illustrates a cross section of a closer view of the spherical joint 122 and other nearby components. The spherical joint 122 can include an inner race 125, an outer race 128, a bracket 129, and any other suitable components.

The bracket 129 may include any suitable structure configured to support the outer race 128. For example, the bracket 129 may include an opening, gap, or hollow channel configured to fit the outer race 128. Additionally, the bracket 129 may be configured for coupling to an external structure. For example, the bracket 129 may include one or more attachment points 177, such as threaded screw holes or bolt slots, for fixedly connecting to an external structure. Accordingly, the bracket 129 may couple the spherical joint 122 and thereby the linear actuator 120 to the external structure.

The outer race 128 may approximate a ring-shape with an opening, gap, or hollow channel with a concave spherical interior surface configured to accommodate the inner race 125. The outer race 128 may be disposed within and/or coupled to the bracket 129. For example, the outer race 128 may be sized and shaped to fit snugly within the bracket 129. Additionally, a threaded ring 142 or the like can be provided for securing the outer race 128 to the bracket 129. The threaded ring 142 can apply pressure on a first side of the outer race 128, and a second side of the outer race 128 can be in contact with a flange or another portion of the bracket 129. As a result, the outer race 128 can be fixedly connected to the bracket 129. The threaded ring 142 can also provide additional load-bearing capacity (e.g., in axial directions) to the spherical joint 122.

The inner race 125 may be disposed within the outer race 128. For example, the inner race 125 may be sized and shaped to fit snugly within the outer race 128. The inner race 125 may have a convex spherical shape. A convex spherical shape of the inner race 125 may have matching curvature or otherwise conform to the concave spherical surface of the outer race 128. The inner race 125 may also be referred to as a spherical component of the spherical joint 122 or a spherical bearing. Additionally, the inner race 125 may include the hollow channel 150, which is discussed in more detail above.

The inner race 125 may be rotatably coupled to the outer race 128. In other words, the inner race 125 may be configured to rotate within the outer race 128 while remaining contained within the outer race 128. The inner race 125 may be able to rotate in multiple directions. For example, embodiments allow contacting surfaces of the inner race 125 and/or the outer race 128 to glide or slide with relatively low friction. Slidable contact can be accomplished through lubrication. In some embodiments, movement can be facilitated by providing ball bearings, rollers, and/or any other suitable components between the inner race 125 and the outer race 128.

The inner race 125 may be coupled to the housing 126. As shown in FIG. 3, a portion (e.g., an extension or flange) of the housing 126 can extend into the hollow channel 150 of the inner race 125. This can be in addition to a portion of the translating component 123, which may be enclosed within the portion of the housing 126, such that both the translating component 123 and the housing 126 are at least partially disposed within the hollow channel 150. The portion of the housing 126 may be sized and shaped to fit snugly within the hollow channel 150. Additionally, a nut 141 or the like can be provided for securing the inner race 125 to the housing 126. The nut 141 can apply pressure on a first side of the inner race 125, and a second side of the inner race 125 can be in contact with a side, a flange, or another portion of the housing 126. As a result, the inner race 125 can be fixedly connected to the housing 126 and/or positioned adjacent to the main body of the housing 126. Accordingly, the inner race 125 may couple the spherical joint 122 (and thereby the external structure) to the rest of the linear actuator 120. Embodiments allow the inner race 125 (and spherical joint 122) to be positioned on either side (e.g., aft or forward) of the housing 126.

Accordingly, in some embodiments, the inner race 125 may be fixedly attached to the housing 126 and thereby the other components of the linear actuator 120, while the outer race 128 may be fixedly attached to the bracket 129 which may be fixedly attached to an external structure. Thereby, different portions of the spherical joint 122 can be connected to the linear actuator 120 and the external structure, respectively, while the outer race 128 and the inner race 125 of the spherical joint 122 can move and rotate relative to one another. Through this flexible connection, the rest of the linear actuator 120 (e.g., the housing 126, translating component 123, the driving component 124, and other components) can be allowed to shift and move relative to the external structure while remaining coupled to the external structure. When the external structure moves or otherwise transmits external forces into the spherical joint 122, the spherical joint 122 can absorb the forces by passively adjusting through rotation between the outer race 128 and the inner race 125.

In an alternative embodiment, the outer race 128 can be coupled to the housing 126 (instead of the bracket 129 and/or external structure), and the inner race 125 can be coupled to the bracket 129 and/or external structure (instead of the housing 126).

According to embodiments, the spherical joint 122 can be configured provide three degrees of rotational freedom. For example, the inner race 125 may be able to rotate about each of three axis that are perpendicular to one another.

In some embodiments, the spherical joint 122 can be configured so that rotation is limited or constrained in one or more rotational directions. For example, one or more anti-rotation components may be included to limit certain movements of the spherical joint 122. As shown in FIG. 3, in some embodiments, the bracket 129 can include a notch 131 (also referred to as a groove), and the housing 126 can include a tab 132 (e.g., a cylindrical pin or nut). The notch 131 and the tab 132 can be configured to restrict the housing 126 from rotating about the longitudinal axis of the translating component 123 and/or linear actuator 120.

Figure 4B:
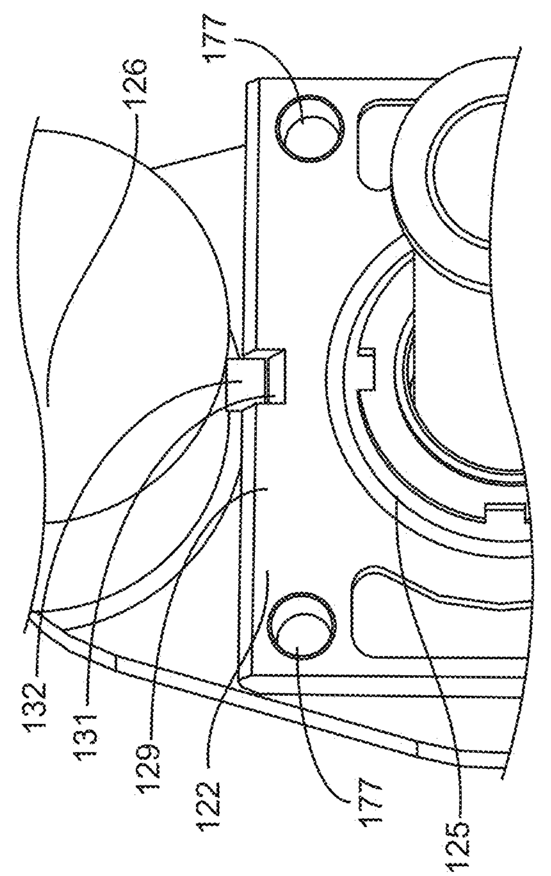
FIG. 4B illustrates a closer rear-view of a spherical joint of a linear actuator, according to embodiments.
Figure 4A:
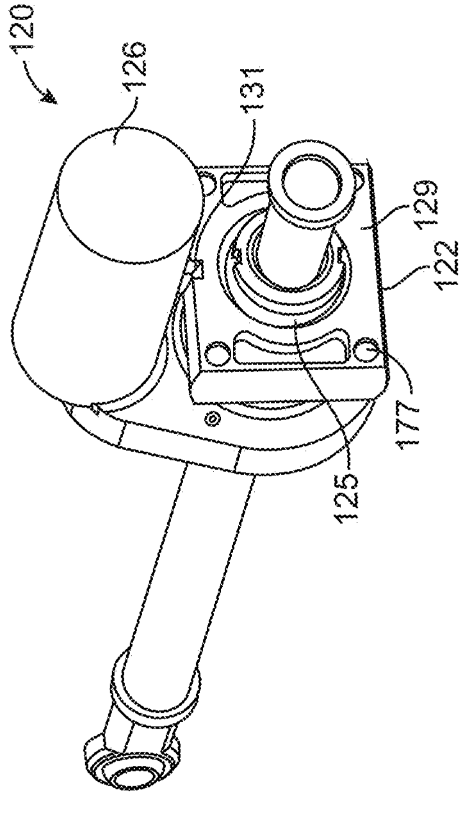
FIG. 4A illustrates a rear-view of a linear actuator, according to embodiments.

FIGS. 4A-4B illustrate a rear-view of the linear actuator 120 and the spherical joint 122. As shown in FIGS. 4A-4B, the tab 132 can be positioned within the notch 131, and may have a similar and/or slightly smaller width as the notch 131. As a result, if the housing 126 begins to rotate about the longitudinal axis, the tab 132 may contact one or more walls of the notch 131 such that the tab 132 (e.g., and thereby the housing 126) may be restrained by the fixed bracket 129. The notch 131 may be elongated in a direction parallel to the longitudinal axis, such that the tab 132 may be allowed to freely move in that direction. The notch 131 may also be deeper than the tab 132 such that the tab 132 can move up and down within the notch 131. As a result, rotational movement about the longitudinal axis can be restricted, while rotational movement in other directions (e.g., two other rotational directions) can be permitted.

As discussed above, the housing 126 can be attached to the inner race 125. Accordingly, restraining movements of the housing 126 can cause restraint of the inner race 125 within the outer race 128, and the linear actuator 120 as a whole, in the predetermined rotational direction. The inner race 125, and thereby the spherical joint 122 and/or the linear actuator 120, can retain at least two degrees of rotational freedom.

Accordingly, one of the three rotational degrees of freedom can be constrained mostly or entirely. This can prevent undesired rotation caused as a byproduct of the actuating mechanism (e.g., gears acting on the driving component 124). In some embodiments, a small gap can exist between the tab 132 and the notch 131 so that the spherical joint 122 is not entirely constrained, and can still rotate in the other two directions, and/or also allowing a predetermined amount (e.g., a small amount) of rotation about the constrained direction. The tab 132 and/or notch 131 may be positioned directly vertically above the longitudinal axis of the translating component 123.

In some embodiments, the notch 131 and the tab 132 can instead be positioned on other components to provide a similar anti-rotation effect. For example, the notch 131 can be included on the inner race 125, and the tab 132 can be included on the outer race 128 or the bracket 129.

Referring back to FIGS. 1A-1B, as discussed above, the coupler 121 may take the form of a spherical joint. The coupler 121 may be connected to a corresponding coupling component of an external structure to couple the linear actuator 120 to the external structure. In some embodiments, one or more components may be included to limit certain movements of the coupler 121. For example, the coupler 121 can include one or more tabs or prongs protruding away from the coupler 121 in a direction perpendicular to the longitudinal axis of the translating component 123. The tabs can be configured to contact the corresponding coupling component and/or one or more spacers (e.g., disposed between the coupler 121 and the corresponding coupling component of the external structure) in the event of rotation about the longitudinal axis of the translating component 123. As a result, the coupler 121, and thereby the linear actuator 120, can be prevented from rotating about the longitudinal axis of the translating component 123. In other words, one of the three rotational degrees of freedom can be constrained mostly or entirely. This can prevent undesired rotation caused as a byproduct of the actuating mechanism. In some embodiments, a small gap can exist between the tabs and the spacers so that the coupler 121 is not entirely constrained, and can still rotate in the other two directions.

Figure 5:
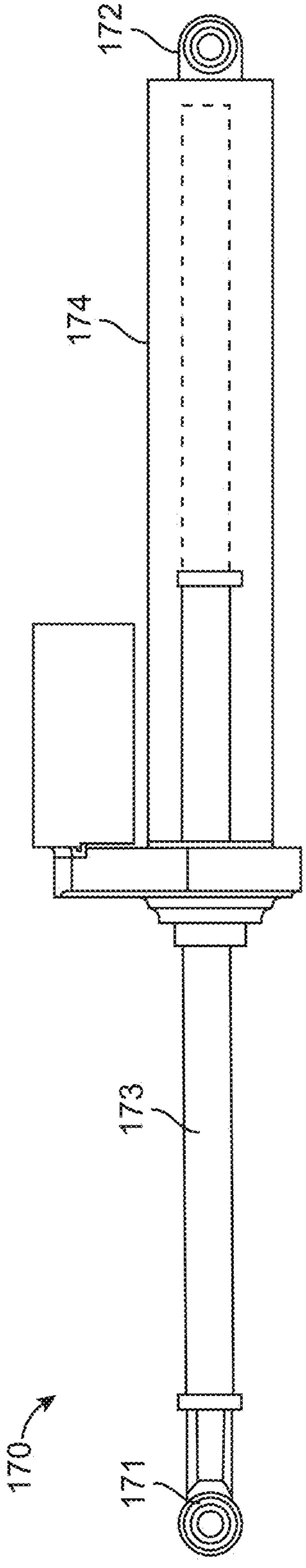
FIG. 5 illustrates an alternatively configured linear actuator, according to embodiments.

Embodiments advantageously provide a capacity for maintaining linear actuator alignment in a manner that is compact, less complex, lighter weight, and stronger when compared to alternatives. For example, FIG. 5 illustrates an alternatively configured linear actuator 170. This linear actuator 170 includes a first spherical coupler 172 that is oriented perpendicular to the longitudinal axis of the linear actuator 170 and fixedly positioned to a structural tube 174 at a distance beyond the second end of the linear actuator 170, in contrast with the spherical joint 122 illustrated in FIGS. 1A-1B. The first spherical coupler 172 can be fixedly connected to a first structure (e.g., via a bolt through the opening in the first spherical coupler 172), while a second spherical coupler 171 can be fixedly connected to a second structure. The structural tube 174 is provided to maintain a rigid structure while allowing the translating component 173 to translate. As the linear actuator 170 operates, the translating component 173 moves in and out of the structural tube 174 as illustrated by the dotted line.

With the spherical couplers on both ends, the linear actuator 170 may be able to passively adjust position in response to external forces and/or maintain internal alignment. However, the linear actuator 170 is less compact than the linear actuator 120 of FIGS. 1A-1B, as the structural tube 174 elongates the overall structure.

A stroke-to-length ratio can be described as the linear travel distance provided by a linear actuator as compared to the total length of the linear actuator when fully extended. The linear actuator 170 of FIG. 5 provides a stroke-to-length ratio of greater than 2:1. In contrast, the linear actuator 120 of FIGS. 1A-1B provides an improved stroke-to-length ratio closer to 1:1. In some embodiments, the linear actuator 120 of FIGS. 1A-1B may have a stroke-to-length ratio of about 1.2:1 or less than 1.2:1. Lesser stroke-to-length ratios are preferable as the apparatus occupies less space to accomplish the same actuating distance.

The linear actuator 120 of FIGS. 1A-1B can achieve the improved stroke-to-length ratio by coupling the spherical joint 122 to the housing 126 and orienting the spherical joint 122 to be parallel to the translating component 123, such that the translating component 123 can travel through the hollow channel 150. As a result, the spherical joint 122 becomes disposed dynamically along the translating component 123 instead of being fixedly positioned to a structure (e.g., the structural tube 174 of FIG. 5) at a distance beyond the translating component 123. In some embodiments, the stroke-to-length ratio can further improve (or reduce) to about 1.1:1 by orienting the motor and housing 126 in the opposite direction (e.g., to the left in the perspective of FIG. 2A), so that the housing 126 does not overhang the translating component 123 when extended.

Thus, for the same amount of travel, the linear actuator 120 of FIGS. 1A-1B is more compact. The difference in stroke-to-length ratios can be seen by comparing the extended position shown in FIG. 5 with the extended position shown in FIG. 2A. The retracted position is also less compact in FIG. 5, as the first spherical coupler 172 and structural tube 174 extend further out to the right than the translating component 173.

Additionally, the linear actuator 170 of FIG. 5 is relatively heavier, due to the extra component weight from the structural tube 174. This is a significant disadvantage in applications where total weight of the structure incorporating the linear actuator has a critical limit (e.g., aircraft or other aeronautical applications).

Further, the linear actuator 170 of FIG. 5 has less compressive strength and is more prone to buckling compared to the linear actuator 120 illustrated in FIGS. 1A-1B. The distance between the coupling points (e.g., the first spherical coupler 172 and the second spherical coupler 171) is relatively longer, and this can create a "long column" effect when the translating component 173 is extended. When fully extended, the coupling points are distanced apart by about twice the length of the translating component 173. In contrast, the linear actuator 120 of FIGS. 1A-1B is configured so that the two coupling points (e.g., the coupler 121 and the spherical joint 122) are closer at any given point in the actuation. For example, the maximum distance between the two coupling points is about the length of the translating component 123 when extended (as shown in FIG. 2A), the minimum distance between two coupling points is about the length of the driving component 124 when retracted (as shown in FIG. 2C). As a result, the linear actuator 120 of FIGS. 1A-1B is stronger, more rigid, and less subject to buckling.

According to embodiments, the spherical joint 122 can be utilized with any suitable type of linear actuator. While a ball screw linear actuator is depicted in the figures, any type of linear actuator that could physically accommodate a spherical joint as illustrated in the figures (e.g., surrounding a rod and oriented parallel to the rod) can be used instead of a ball screw linear actuator.

As mentioned above, the linear actuator 120 may be coupled to two structures, according to embodiments. The linear actuator 120 can cause one or more external structures to move. For example, a first structure may have a fixed location, and a second structure may be configured to move or tilt relative to the first structure when the linear actuator 120 operates. Embodiments allow the linear actuator 120 to be utilized in any suitable context for any suitable structures. In one example, the linear actuator 120 can be used for actuating aircraft components.

Figure 6A:
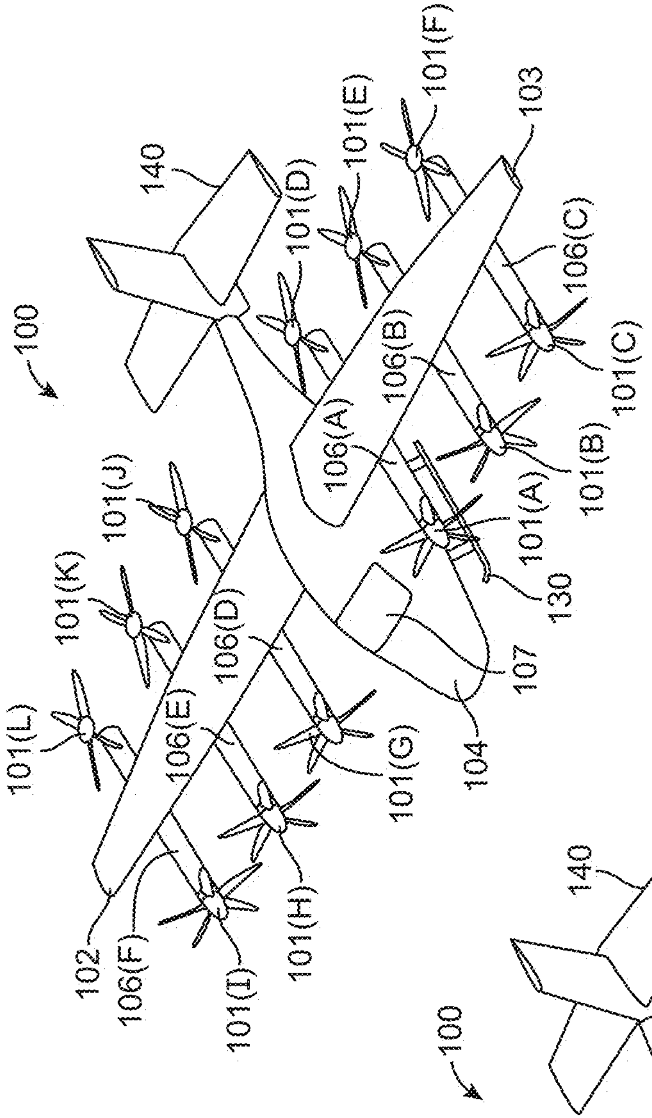
FIGS. 6A-6B depict planar views of an exemplary aircraft, according to embodiments.
Figure 6B:
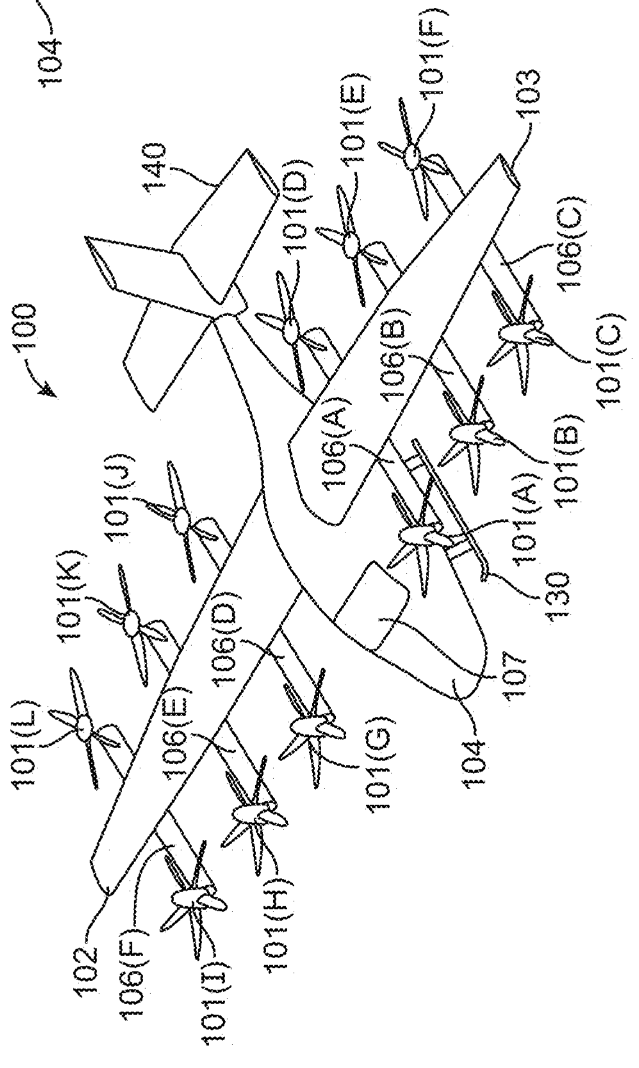

FIGS. 6A and 6B depict planar views of an exemplary aircraft 100, according to embodiments. The aircraft 100 can be any suitable type of flying vehicle, such as an airplane, a helicopter, a drone or a hybrid-type flying vehicle. In some embodiments, the aircraft 100 may be capable of vertical take-off and landing (VTOL). The aircraft 100 can be configured for human piloting, remote piloting, and/or autonomous flight.

In the example shown, aircraft 100 includes a fuselage 104 that may include a cabin section (e.g., toward the nose) for carrying passengers and/or cargo. One or more wings including a first wing 102 and a second wing 103 can be mounted on or otherwise attached to the fuselage 104.

The aircraft 100 can include support structures 106(A)-(F), which may be coupled to the wings 102, 103. As shown in FIGS. 6A-6B, each of the support structures 106(A)-(F) may take the form of a boom, though embodiments include any other suitable structure. Six support structures 106(A)-(F) are shown in FIGS. 6A-6B, where three support structures 106(A)-(F) are provided under each of the pair of wings 102, 103. The support structures 106(A)-(F) may be coupled to the undersides of the pair of wings, and may include a forward portion extending forward beyond the wing and an aft portion extending aft of the wing.

The aircraft 100 can also include propulsion systems 101(A)-(L). Each of the propulsion systems 101(A)-(L) may be configured to provide thrust to the aircraft 100. One or more of the propulsion systems 101(A)-(L) may be mounted on the support structures 106(A)-(F). For example, pairs of propulsion systems 101(A)-(L) may be mounted on opposite ends of a respective support structure 106(A)-(F), with one propulsion system mounted forward of the wing and another propulsion system mounted aft of the wing. In other embodiments, one or more of the propulsion systems 101(A)-(L) may be coupled directly to the wings.

One or more of the propulsion systems 101(A)-(L) may be configured to change orientation. For example, one or more of the propulsion systems 101(A)-(L) may be configured and/or mounted in a manner that allows the angle and orientation to be tiltable relative to a respective wing 102 or 103, a respective support structure 106(A)-(F), and/or the aircraft 100. As a result, a tilting propulsion system can be configured to provide thrust in more than one direction relative to the aircraft 100.

Tilting propulsion system may be configured to switch (e.g., rotate or tilt) between a forward flight configuration (e.g., a horizontal orientation) and a vertical flight configuration (e.g., a vertical orientation). FIG. 6A illustrates the tilting propulsion systems 101(A), 101(B), 101(C), 101(G), 101(H) and/or 101(I) as currently set to a forward flight configuration (also referred to as a second tilt configuration or a second tilt angle). FIG. 6B illustrates the tilting propulsion systems 101(A), 101(B), 101(C), 101(G), 101(H) and 101(I) as currently set to a vertical flight configuration (also referred to as a first tilt configuration or first tilt angle).

The propulsion system 101 can be controlled to switch between the tilt configurations to provide additional thrust in any suitable direction, depending on current movement needs of aircraft. For example, during takeoff, landing, and/or hovering, the propulsion system 101 may be set to a vertical flight configuration to provide additional vertical thrust. During forward cruising flight, the propulsion system 101 may be set to a forward flight configuration to provide horizontal thrust. During stages of forward acceleration, deceleration, altitude gaining, and/or altitude decreasing, the propulsion system 101 may be set to an intermediary tilt angle and configuration to provide both a horizontal thrust component and a vertical thrust component.

A tilting propulsion system may be coupled to a respective support structure via a linear actuator, one or more rotatable joints, and/or any other suitable components for providing a rotatable coupling. For example, a linear actuator can be configured to cause a tilting propulsion system to tilt.

Figure 7A:
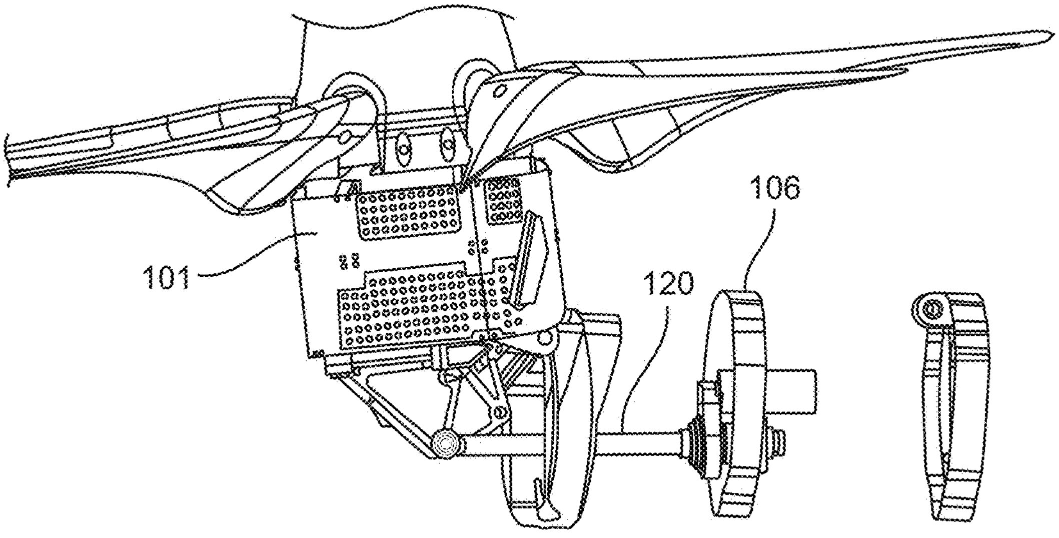
FIGS. 7A-7C illustrate an example of a linear actuator coupled to or incorporated in a propulsion system, according to some embodiments.
Figure 7B:
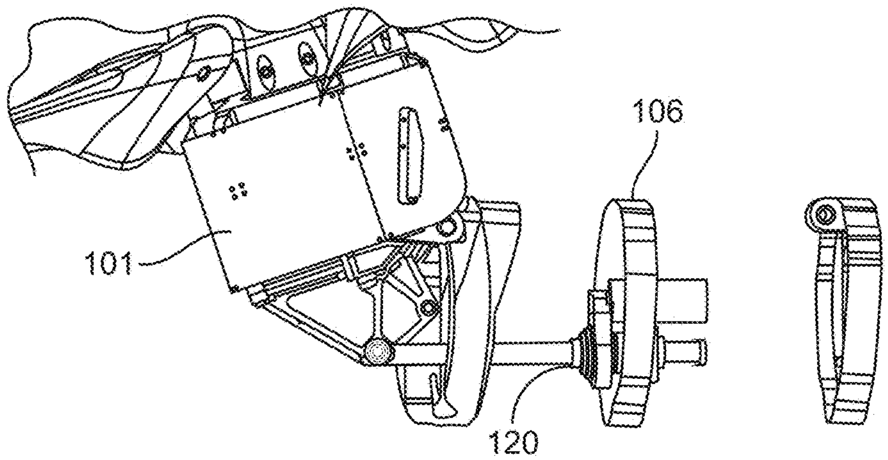
Figure 7C:
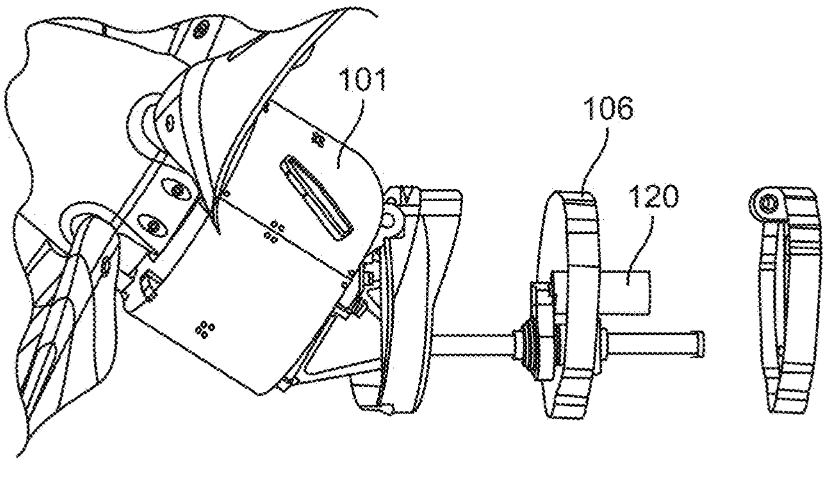

FIGS. 7A-7C illustrate an example of a linear actuator 120 coupled to a support structure 106 (e.g., a first structure) and a propulsion system 101 (e.g., a second structure). The linear actuator 120 may be configured to tilt or otherwise actuate the propulsion system 101 relative to the support structure 106. The linear actuator 120 may be locationally anchored to the support structure 106, which may also be referred to as a fixed structure. The linear actuator 120 may be configured to extend and/or retract a translating component from the support structure 106 to tilt (e.g., up and/or down) the propulsion system 101, which may also be referred to as a moveable structure.

The support structure 106 may surround the linear actuator 120. Representative portions (e.g., brackets) of the support structure 106 are illustrated in FIGS. 7A-7C. Other components and/or an enclosure of the support structure 106 are not illustrated in FIGS. 7A-7C in order to show the linear actuator 120. The support structure 106 may be a continuous structure surrounding the linear actuator 120. In some embodiments, the support structure 106 may be formed of multiple components at least partially surrounding the linear actuator 120.

In FIG. 7A, the propulsion system 101 is set to a vertical (or near vertical) position. In FIG. 7B, as the linear actuator 120 actuates (e.g., retracts the translating component), the propulsion system 101 tilts to an angled position. In FIG. 7C, as the linear actuator 120 continues to actuate (e.g., retract translating component), the propulsion system 101 tilts to a further angled position, approaching a forward flight configuration.

During operation of an aircraft and/or tilting mechanism, various aircraft structures (e.g., boom, propulsion system, brackets, etc.) may undergo some amount of deformation (e.g., twisting, flexing, bending) and/or positional movement due to large forces from drag, heavy components, etc. This can then cause a fixedly attached linear actuator (e.g., without a spherical joint) to experience bending loads, shear loads, torsion, and/or other undesired forces. According to embodiments, these bending loads can instead cause a slight rotation (e.g., a passive adjustment and/or automatic change in angle) between a portion of the spherical joint (e.g., an outer race) and the housing of the linear actuator, and thereby the bending loads can be absorbed by the spherical joint. As a result, alignment is preserved between the housing, the motor, the gears, the driving component, and the translating component, and extra loads on the linear actuator are prevented.

In an alternative configuration, the linear actuator 120 may include a trunnion mount instead of a spherical joint for coupling to the support structure 106 and providing rotational adjustment capabilities. A trunnion mount may be another type of flexible joint, typically has one degree of freedom, and can absorb misalignment in one direction. However, a trunnion mount typically cannot absorb misalignment in other directions. Also, trunnion mounts are undesirably heavy, large, complex, and expensive. Accordingly, embodiments preferably utilize a spherical joint instead of a trunnion mount to provide additional capacity for preventing misalignment, to reduce weight, to reduce complexity, and/or to reduce costs.

While the linear actuator is primarily discussed herein in the context of a tilting propulsion system on an aircraft, embodiments can be applied to any other suitable linear actuator application on an aircraft and in other non-aircraft applications.

For simplicity, various active and passive circuitry components are not shown in the figures. In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "front or "back" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "front" surface can then be oriented "back" from other elements or features. The device can be otherwise oriented (e.g., rotated 90 degrees or at other orientations) and the spatially relative descriptors used herein interpreted accordingly.

While the invention has been described with reference to specific embodiments, those skilled in the art with access to this disclosure will appreciate that variations and modifications are possible.

It should be understood that all numerical values used herein are for purposes of illustration and may be varied. In some instances, ranges are specified to provide a sense of scale, but numerical values outside a disclosed range are not precluded.

It should also be understood that all diagrams herein are intended as schematic. Unless specifically indicated otherwise, the drawings are not intended to imply any particular physical arrangement of the elements shown therein, or that all elements shown are necessary. Those skilled in the art with access to this disclosure will understand that elements shown in drawings or otherwise described in this disclosure can be modified or omitted and that other elements not shown or described can be added.

The above description is illustrative and is not restrictive. Many variations of the invention will become apparent to those skilled in the art upon review of the disclosure. The scope of patent protection should, therefore, be determined not with reference to the above description, but instead should be determined with reference to the following claims along with their full scope or equivalents.

What is claimed is:

1. A linear actuator comprising:

a housing;

a translating component; and a spherical joint coupled to the housing and oriented parallel to a longitudinal axis of the translating component, wherein the translating component is configured to translate with respect to the spherical joint and the housing, wherein the spherical joint includes:

an outer race;

an inner race; and a notch and a tab configured to restrict the inner race from rotating about the longitudinal axis of the translating component.

2. The linear actuator of claim 1, wherein the spherical joint includes a hollow channel, and the translating component is at least partially disposed within the hollow channel, wherein the translating component is configured to translate through the hollow channel when the linear actuator operates.

3. The linear actuator of claim 2, wherein the longitudinal axis of the translating component is a first longitudinal axis, wherein the hollow channel has a second longitudinal axis, and the first longitudinal axis is parallel to the second longitudinal axis.

4. The linear actuator of claim 2, wherein a portion of the housing is disposed within the hollow channel, and the translating component is at least partially disposed within the portion of the housing within the hollow channel.

5. A linear actuator, comprising:

a housing;

a translating component;

a spherical joint coupled to the housing and oriented parallel to a longitudinal axis of the translating component, wherein the translating component is configured to translate with respect to the spherical joint and the housing; and a coupler coupled to a first end of the translating component, wherein the spherical joint and the housing are positioned between the first end and a second end of the translating component provided opposite from the first end.

6. The linear actuator of claim 5, wherein the spherical joint is a first spherical joint, the coupler is a second spherical joint oriented perpendicular to the longitudinal axis of the translating component, the second spherical joint has fixed location relative to the translating component, and the second spherical joint is oriented perpendicular to the first spherical joint.

7. The linear actuator of claim 5, wherein the spherical joint is configured to couple the housing to a first structure, and the coupler is configured to couple the translating component to a second structure, such that the linear actuator to configured to cause the second structure to move relative to the first structure.

8. A linear actuator, comprising:

a housing;

a translating component;

a spherical joint coupled to the housing and oriented parallel to a longitudinal axis of the translating component, wherein the translating component is configured to translate with respect to the spherical joint and the housing;

a driving component coupled to the housing and provided around the translating component, and configured to cause the translating component to translate; and an electric motor provided within the housing and configured to operate the driving component.

9. The linear actuator of claim 8, wherein the translating component is configured to translate relative to the spherical joint, the housing, the driving component, and the electric motor, and wherein the spherical joint, the housing, the driving component, and the electric motor are configured to maintain fixed positions relative to one another.

10. A linear actuator, comprising:

a housing;

a translating component;

a spherical joint coupled to the housing and oriented parallel to a longitudinal axis of the translating component, wherein the translating component is configured to translate with respect to the spherical joint and the housing; and a driving component coupled to the housing and provided around the translating component, wherein the translating component is coaxial with the driving component.

11. The linear actuator of claim 10, further comprising:

a coupler coupled to the translating component, wherein the spherical joint is configured to couple the housing to a first structure, wherein the coupler is configured to couple the translating component to a second structure, wherein the spherical joint is configured to passively adjust positioning in response to a position change of the first structure or the second structure, thereby maintaining alignment between the translating component and the driving component.

12. The linear actuator of claim 1, wherein the spherical joint includes:

a bracket configured to couple to a first structure, wherein the outer race is coupled to the bracket, and wherein the inner race disposed is within the outer race and coupled to the housing, the inner race having a spherical shape with a hollow channel, wherein a portion of the housing is disposed within the hollow channel, and the translating component is at least partially disposed within the portion of the housing within the hollow channel.

13. The linear actuator of claim 12, wherein the inner race is configured to rotate within the outer race such that the spherical joint is configured to passively adjust position in response to external forces.

14. The linear actuator of claim 13, wherein the inner race has at least two degrees of rotational freedom.

15. The linear actuator of claim 1, wherein the linear actuator has a stroke-to-length ratio equal to or less than 1.2 to 1.

16. An aircraft comprising:

a linear actuator, comprising:

a housing;

a translating component; and a spherical joint coupled to the housing and oriented parallel to a longitudinal axis of the translating component, wherein the translating component is configured to translate with respect to the spherical joint and the housing; and a tiltable propulsion system coupled to the linear actuator.

17. A system comprising:

a linear actuator including:

a housing;

a translating component; and a spherical joint coupled to the housing and oriented parallel to a longitudinal axis of the translating component, wherein the translating component is configured to translate with respect to the spherical joint and the housing;

a support structure of an aircraft, the support structure coupled to the housing by the spherical joint; and a tiltable propulsion system of the aircraft, the tiltable propulsion system coupled to the translating component, wherein the translating component is configured to cause the tiltable propulsion system to tilt relative to the support structure when the translating component is actuated.

18. The system of claim 17, wherein the spherical joint is configured to passively adjust in response to a position change or an angle change of the support structure or the tiltable propulsion system, thereby maintaining internal alignment of the linear actuator.

* * * * *